(12) United States Patent
Tadaki

(10) Patent No.: US 6,703,595 B2
(45) Date of Patent: Mar. 9, 2004

(54) OPTICAL DATA-PROCESSING APPARATUS

(75) Inventor: Kyoko Tadaki, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 80 days.

(21) Appl. No.: 10/079,323

(22) Filed: Feb. 20, 2002

(65) Prior Publication Data

US 2003/0075669 A1 Apr. 24, 2003

(30) Foreign Application Priority Data

Oct. 23, 2001 (JP) ......................................... 2001-324561

(51) Int. Cl.⁷ ........................ G02B 27/40; G02B 27/64; G11B 7/00; G11B 5/56; G11B 5/58
(52) U.S. Cl. ............................... 250/201.5; 250/201.2; 369/44.14; 369/44.23; 369/44.32; 369/44.41; 369/53.28
(58) Field of Search ...................... 250/201.2, 201.4, 250/201.5; 369/44.14, 44.23, 44.26, 44.32, 44.41, 53.28, 112.15, 112.19, 112.24, 112.28

(56) References Cited

U.S. PATENT DOCUMENTS

| | | | | |
|---|---|---|---|---|
| 5,151,889 A | * | 9/1992 | Saimi | |
| 5,444,233 A | * | 8/1995 | Sasaki | |
| 5,708,638 A | * | 1/1998 | Braat | |
| 6,229,600 B1 | * | 5/2001 | Martynov | |
| 2001/0005344 A1 | * | 6/2001 | Nakano | |
| 2002/0176331 A1 | * | 11/2002 | Ariyoshi | |

* cited by examiner

Primary Examiner—David Porta
Assistant Examiner—David C. Meyer
(74) Attorney, Agent, or Firm—Greer, Burns & Crain, Ltd.

(57) ABSTRACT

An optical data-processing apparatus is provided for writing data to a data storage disk or reading data from the disk. The data-processing apparatus includes first and second light splitters. The first splitter splits reflected light from the storage disk into two semicircular rays. The second splitter splits these two semicircular rays into non-biased light and biased light. The data-processing apparatus also includes an optical detector for receiving the non-biased light and the biased light, thereby producing a first signal corresponding to the non-biased light and a second signal corresponding to the biased light. Based on the first and the second signals, a focus error signal and a spherical aberration signal are produced.

5 Claims, 12 Drawing Sheets

$L_{SAS} = (Lg + Li + Lk) - (Lh + Lj + Ll)$ $L_{FES} = (La - Lb) + (Lc - Ld) > 0$ $L_{FES} = (La - Lb) + (Lc - Ld) = 0$ $L_{FES} = (La - Lb) + (Lc - Ld) < 0$

OPTICAL DATA-PROCESSING APPARATUS

BACKGROUND OF THE INVENTION

1. Field of the Invention

The present invention relates to an optical data-processing apparatus of the type which is provided with an objective lens facing an optical data storage medium for making a light spot on the storage medium. In particular, the present invention relates to a technique applicable for such a data-processing apparatus whereby spherical aberration due to the thickness error of the substrate of the storage medium is properly detected. In this specification, an "optical data storage disk" may refer to any type of data storage medium with which desired information is written or read out optically. For instance, the optical storage medium may be a read-only disk (such as CD-ROMs), magneto-optical disk or phase change optical disk.

2. Description of the Related Art

For detection of a focus error in an optical data-processing apparatus, Foucault method is often employed. This method can be implemented in a conventional optical data-processing apparatus as shown in FIG. 11 of the accompanying drawings.

Specifically, in the conventional apparatus, a laser beam emitted from a laser diode 90 passes through a collimating lens 91, a first beam splitter 92a and an objective lens 93, to strike upon an optical data storage disk D. The laser beam, after reflected on the disk D, passes through the objective lens 93 again and enters the first beam splitter 92a. This time, the laser beam is reflected in the beam splitter 92a, to be directed toward a second and a third beam splitters 92b, 92c. In the splitters 92b and 92c, as shown in FIG. 11, the laser beam is partly reflected (upward in the figure) and partly allowed to pass through. The reflected light in the second beam splitter 92b is led to a magneto-optical signal detector, while the reflected light in the third beam splitter 92c is led to a tracking error detector.

The laser beam having passed through the splitters 92b and 92c is led to a compound prism 94 and to a focus error detector which incorporates a light detecting device 95. Then, a focus error signal is generated by the Foucault method in the manner described below.

Referring to FIG. 12, as passing through the compound prism 94, the laser beam splits into an upper ray and a lower ray both of which have a semicircular cross section. These two rays are detected by the light detecting device 95. In the illustrated situation, when a focus error occurs, the two semicircular light spots on the detecting device 95 shift in position. The detecting device 95 has a light-receiving surface quartered into first~fourth sections a~d by two division lines Lx and Ly perpendicular to each other. Each of the four sections a~d receives light, to generate a detection signal corresponding to the amount of the received light. The signals outputted from the detecting device 95 are supplied to a focus error signal generator (FESG) 96 to produce a focus error signal (FES). The focus error signal has a level LFES equal to {(La−Lb)+(Lc−Ld)}, where La~Ld are the levels of the detection signals outputted from the sections a~d, respectively.

The Foucault method will now be described with reference to FIGS. 13A~13B, 14A~14B and 15A~15B.

When the focusing of the objective lens 93 is proper (FIG. 14A), each of the two beam spots on the detecting device 95 has an oval form that is symmetrical with respect to the horizontal division line Lx. In this case, the $L_{FES}$ becomes zero. However, when the objective lens 93 is too close to the disk D (FIG. 13A), the two beam spots will take a form and a position as shown in FIG. 13B. In this case, the $L_{FES}$ becomes greater than zero. On the other hand, when the lens 93 is too distant from the disk D (FIG. 15A), the two beam spots will take a form and a position as shown in FIG. 15B. In this instance, the $L_{FES}$ becomes smaller than zero.

As seen from the above, the focus error signal can be used for detection of the defocusing of the objective lens 93. More precisely, it is possible to detect the extent and direction of the defocusing of the lens 93 based on the focus error signal (FES). Thus, the focus control for the lens 93 can be performed based on the FES, whereby the lens 93 is moved toward or away from the disk D (i.e., in the focus direction) for focus adjustment.

A typical optical disk may include a transparent substrate and a recording layer formed on this substrate. In using such an optical disk, the laser beam is first led through the transparent substrate and then shone on the recording layer. Unfavorably, the substrate of an optical disk may lack uniformity in thickness (i.e., the substrate has a thickness error), which causes spherical aberration. Spherical aberration makes it difficult to bring the objective lens to the right focus position in performing the focus control. Accordingly, it is impossible to make a sufficiently small light spot on the storage disk, and therefore the required data-recording or data-reading cannot be performed. Recently, a high NA objective lens (NA stands for "numerical aperture") is preferred for increasing the data storage density of the storage disk. However, since the spherical aberration is proportional to the fourth power of the NA, the apparatus incorporating a high NA objective lens may suffer unacceptably large spherical aberration. In the past, no easy but accurate technique has been proposed for detecting spherical aberration caused by the substrate thickness error.

SUMMARY OF THE INVENTION

The present invention has been proposed under the circumstances described above. It is, therefore, an object of the present invention to provide an optical data-processing apparatus whereby the occurrence of spherical aberration can be detected easily and accurately.

According to a first aspect of the present invention, there is provided an optical data-processing apparatus that includes: an objective lens for convergence of light beams emitted from a light source to make a beam spot on a recording layer of an optical data storage medium; a first light splitter for splitting reflected light from the storage medium into two semicircular rays; a second light splitter for splitting the two semicircular rays into non-biased light and biased light which has a different optical path length than the non-biased light; an optical detector that receives the non-biased light and the biased light, thereby producing a first signal corresponding to the received non-biased light and a second signal corresponding to the received biased light; a first signal processing unit for generating a focus error signal based on the first signal; and a second signal processing unit for generating a spherical aberration signal based on the second signal.

In the above data-processing apparatus, the focus error signal, which is obtained on the basis of the above-mentioned non-biased light, may be produced by the Foucault method as in the prior art discussed above. The spherical aberration signal, on the other hand, is obtained on the basis of the above-mentioned biased light. Since the biased light has an optical path length different from the counterpart of the non-biased light, the profile of the biased light will change when spherical aberration occurs. Based on this profile change, the spherical aberration signal is obtained. According to the present invention, both a focus error signal and a spherical aberration signal are obtained simultaneously. Thus, while the focus control is being performed, spherical aberration control can also be performed. As a result, an appropriately small beam spot can be formed on the recording layer of the storage medium, which is advantageous to performing proper data writing or data reading with respect to the storage medium.

Preferably, the biased light split by the second light splitter may include plus 1-order diffracted light and minus 1-order diffracted light. In this case, the second signal processing unit may generate the spherical aberration signal based on both the plus 1-order diffracted light and the minus 1-order diffracted light.

With the above arrangement, it is possible to produce a spherical aberration signal which more accurately reflects the properties of the actual spherical aberration.

According to a second aspect of the present invention, there is provided an optical data-processing apparatus which includes: an objective lens unit for convergence of light beams emitted from a light source to make a beam spot on a recording layer of an optical data storage medium; a focus error detector that produces a focus error signal based on reflected light from the storage medium; and a spherical aberration detector into which the reflected light is introduced, the spherical aberration detector being provided separately from the focus error detector. The spherical aberration detector includes: a beam splitter for splitting the reflected light into two beams; a converging lens for convergence of the two beams; a first and a second optical detecting devices for receiving the two beams, the first detecting device and the second detecting device being disposed at different distances from the above converging lens; and a signal processing unit for generating a spherical aberration signal based on intensity distribution of the beams received by the detecting devices.

With the above arrangement, when spherical aberration occurs, the intensity distribution of the light received by the first detecting device is different from the intensity distribution of the light received by the second detecting device. Based on this difference, it is possible to detect the occurrence of spherical aberration. As in the apparatus of the first aspect, focus control and spherical aberration control can both be simultaneously performed.

Preferably, the objective lens unit may be movable in a focus direction and supports a first and a second lenses aligned in the focus direction, the first lens being movable in the focus direction relative to the second lens.

Further, the first lens and the second lens may be simultaneously moved for focus control in the focus direction based on the focus error signal. Also, the first lens may be moved relative to the second lens based on the spherical aberration signal for reduction of spherical aberration.

Other features and advantages of the present invention will become apparent from the detailed description given below with reference to the accompanying drawings.

DETAILED DESCRIPTION OF THE PREFERRED EMBODIMENT

Figure 1:
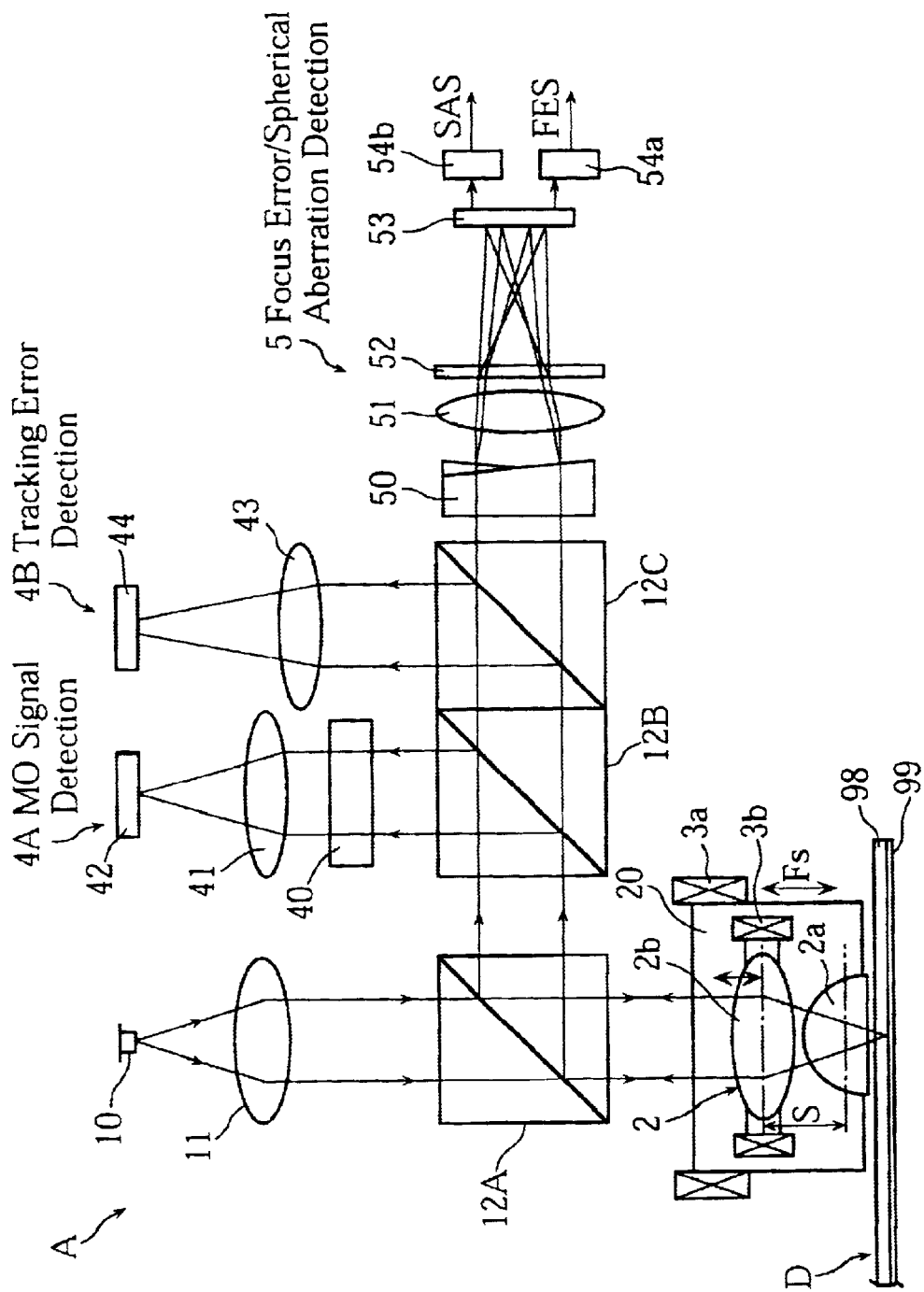
FIG. 1 shows the principal components of an optical data-processing apparatus according to a first embodiment of the present invention.

The preferred embodiments of the present invention will be described below with reference to the accompanying drawings.

Reference is first made to FIGS. 1~4 illustrating an optical data-processing apparatus according to a first embodiment of the present invention. As seen from FIG. 1, the illustrated apparatus A is an optical disk apparatus designed to write data to or read data from an optical disk D. The apparatus A includes a laser diode 10 as a light source from which a laser beam is emitted for irradiating the disk D. The emitted light passes through a collimating lens 11, a first beam splitter 12A and an objective lens assembly 2. The lens assembly 2 includes a lower lens 2a and an upper lens 2b which is disposed farther from the disk D than the lower lens 2a is. These two lenses are supported by a lens holder 20. With the use of more than one lens, a high NA can be attained without increasing the curvature of each lens.

In operation, the lens holder 20 is moved by an actuator 3a in the focus direction Fs. The upper lens 2b is movable relative to the lower lens 2a within the lens holder 20. Specifically, when an actuator 3b is operated, the upper lens 2b is moved toward or away from the lower lens 2a, which is fixed in position within the holder 20. In this manner, the distance S between the two lenses 2a, 2b can be varied.

Figure 4:
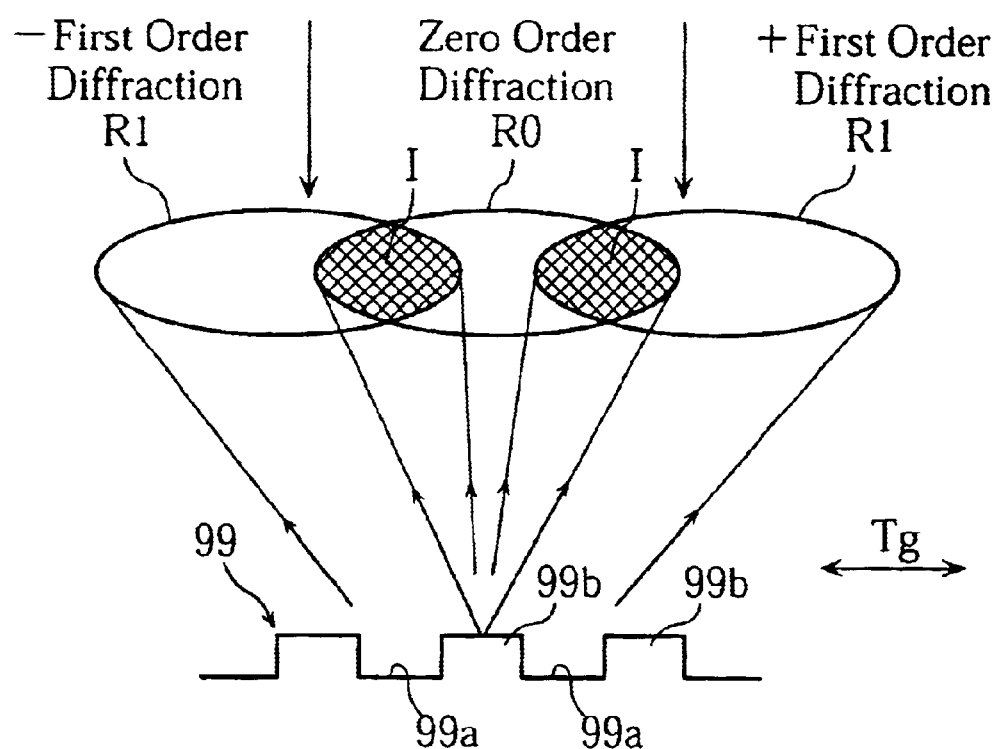
FIG. 4 illustrates how irradiation light is reflected on a data storage disk used for the apparatus of FIG. 1.

The optical disk D includes a substrate 98 made of transparent resin and a recording layer 99 formed on one side of the substrate 98. Though not illustrated, the disk D is supported by a rotatable spindle. The laser beam, after passing through the lens assembly 2, enters the transparent substrate 98 and then irradiates the recording layer 99. As shown in FIG. 4, the recording layer 99 is formed with grooves 99a and lands 99b alternating with the grooves 99a in the tracking direction Tg. The reflected light resulting from the irradiation of the recoding layer 99 includes a 0-order diffracted ray R0 and two 1-order diffracted rays R1 (+ and −). After being reflected upon the recording layer 99, the 0-order diffracted ray (i.e., non-diffracted ray) R0 traces the previous incident path. The 1-order diffracted rays R1 result from the alternating arrangement of the grooves 99a and the lands 99b. As seen from FIG. 4, the plus 1-order diffracted ray R1 and the minus 1-order diffracted ray R1 appear side by side in the tracking direction Tg (the radial direction of the disk D). The 1-order diffracted rays R1 interfere with the 0-order diffracted ray R0 partially, thereby producing interference light I.

As shown in FIG. 1, the upward reflected light from the disk D passes through the lens assembly 2. Then, the light, reflected by the first beam splitter 12A, is directed toward a second and a third beam splitters 12B, 12C. In the second beam splitter 12B, the light is partially reflected upward toward a magneto-optical signal detector 4A, while partially allowed to pass through the splitter 12B. This non-reflected light enters the third beam splitter 12C. The upward light passes through a Wallaston prism 40 and a condenser (converging lens) 41, to be detected by an optical detecting device 42. Based on the thus detected light, the bit of data (i.e., 0 or 1) stored in the recording layer 99 is discerned.

In the third beam splitter 12C, the light is partially reflected upward toward a tracking error detector 4B, while partially allowed to pass through splitter 12C to go to a focus error/spherical aberration detector 5. The upward light, passing through a condenser (converging lens) 43, is detected by an optical detecting device 44. When a tracking error occurs, the plus and minus 1-order diffracted rays R1 become asymmetrical. Based on the detection of this asymmetry, a tracking error signal is generated.

Figure 2:
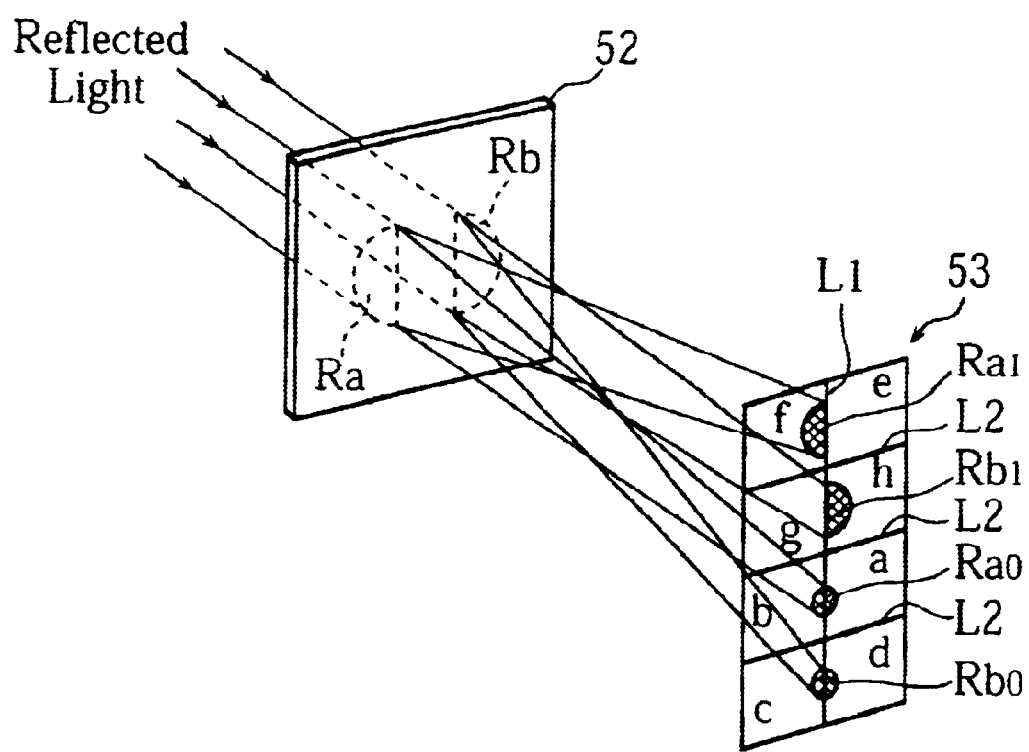
FIG. 2 is a perspective view illustrating how light is split by a holographic element in the apparatus of FIG. 1.

After passing through the second and the third beam splitters 12B~12C, the light is led to the focus error/spherical aberration detector 5. As shown in FIG. 1, the detector 5 includes a compound prism 50, a condenser (converging lens) 51, a holographic element 52 and an optical detecting device 53. The detecting device 53 is connected to first and second signal-processing units 54a, 54b each of which incorporates a central processing unit (CPU) and a memory cooperating with the CPU. The compound prism 50 has a similar function to the compound prism 94 noted with reference to the prior art apparatus. The compound prism 50 splits the reflected light from the disk D into two light beams having a semicircular cross section. These two beams pass through the condenser 51 and enter the holographic element 52. As shown in FIG. 2, the holographic element 52 splits the light beams Ra and Rb into four rays $Ra_0$~$Rb_0$ and $Ra_1$~$Rb_1$. The first pair of the rays $Ra_0$~$Rb_0$ is 0-order light, which is not biased by the holographic element 52, whereas the second pair of the rays $Ra_1$~$Rb_1$ is 1-order diffracted light, which is biased by the holographic element 52. Due to the biasing, the second light pair has a different optical path length than the first light pair.

As shown in FIG. 2, the detecting device 53 has a light-receiving surface divided into eight sections a~h defined by a vertical division line L1 and three horizontal division lines L2. When the focusing of the objective lens is proper, the ray $Ra_0$ is shone on the border between the sections a and b, while the ray $Rb_0$ is shone on the border between the sections c and d. Further, the ray $Ra_1$ is shone on the region e~f, while the ray $Rb_1$ is shone on the region g~h. The detecting device 53 outputs a detection signal whose output level corresponds to the intensity of light received by the sections a~h.

Figure 3:
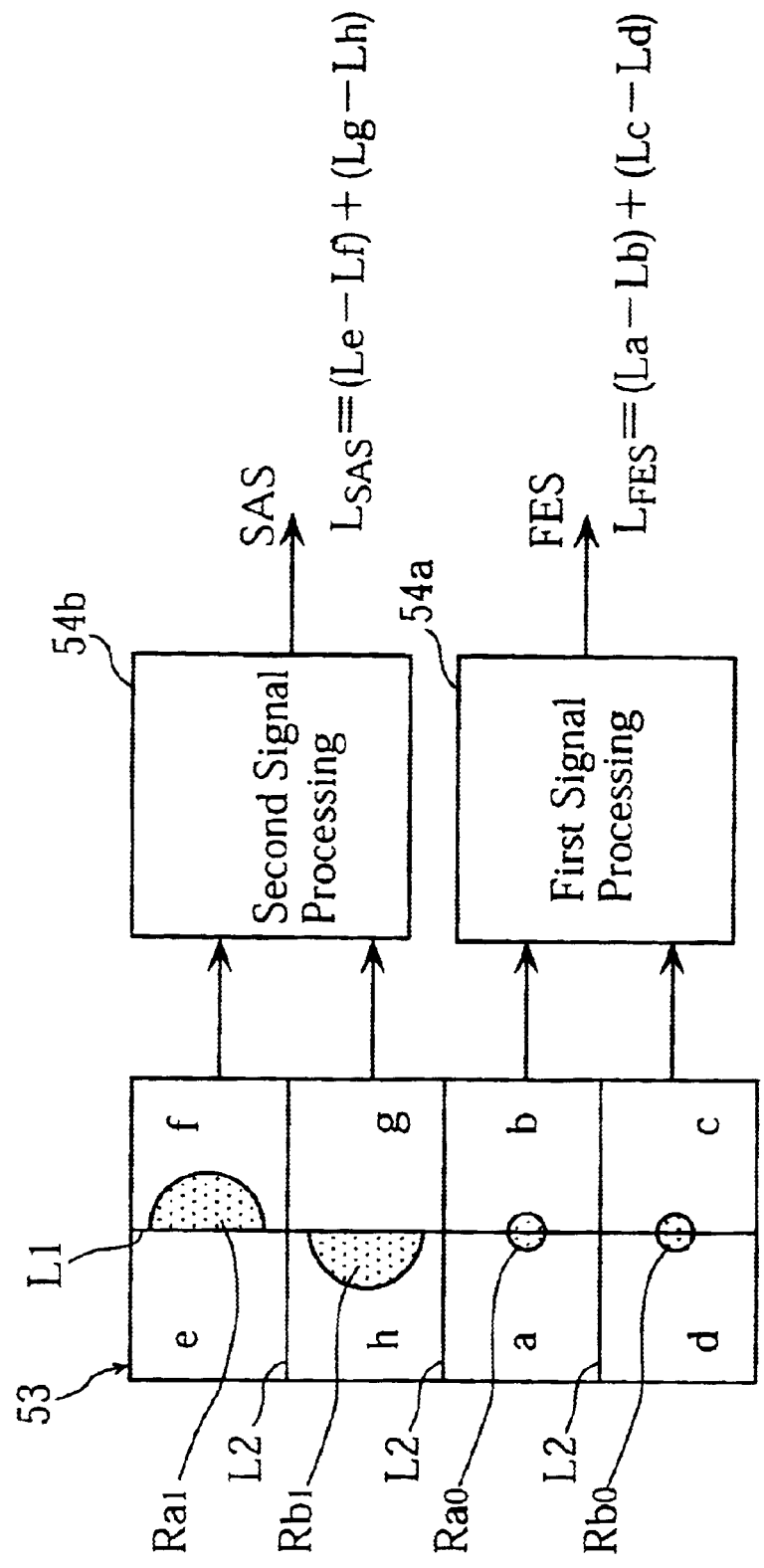
FIG. 3 shows the layout of the light-receiving surface of a detecting device used in the apparatus of FIG. 1 and signal processing units to generate required signals.

As shown in FIG. 3, the first signal-processing unit 54a generates a focus error signal (FES) based on the output from the sections a~d of the detecting device 53. The FES is obtained by the Foucault method described with reference to the prior art. The level $L_{FES}$ of the FES is equal to $\{(La-Lb)+(Lc-Ld)\}$, where La~Ld are the output levels of the signals supplied from the sections a~d, respectively. The absolute value of the $L_{FES}$ corresponds to the degree of the focus error. The sign (+ or −) of the $L_{FES}$ indicates the direction of the defocus of the lens.

The second signal-processing unit 54b generates a spherical aberration signal (SAS) based on the output from the sections e~h of the detecting device 53. The level $L_{SAS}$ of the SAS is equal to $\{(Le-Lf)+(Lg-Lh)\}$, where Le~Lh are the levels of the signals outputted from the sections e~h, respectively. When no spherical aberration occurs, the beam profile of the reflected light is symmetrical before and behind focus, with the lens held at the proper focus point. However, when spherical aberration occurs, the beam profile becomes asymmetrical. As the spherical aberration becomes greater, the 1-order diffracted rays $Ra_1$ and $Rb_1$ will be deformed to a greater extent so that they extend across the vertical division line L1 onto the adjacent sections on the detecting device 53. The absolute value of the spherical aberration signal (SAS) indicates the degree of the spherical aberration, and the sign (+ or −) of the SAS indicates the defocus direction of the aberration.

The SAS is pre-adjusted so that it becomes equal to zero when no spherical aberration appears on the disk D. The pre-adjustment may be made in the following manner. First, a precisely manufactured reference disk (which has no thickness error) is inserted into the disk drive of the data-processing apparatus, while the objective lens is set to the focus position. Then, SAS detection is performed. If the detected signal is equal to zero, no pre-adjustment is made. When the signal is not zero, an offset value is added to the signal through an appropriate circuit, until the signal is adjusted to become zero.

In the data-processing apparatus A, focus control is performed by operating the actuator 3a to move the lens holder 20 (hence the lens assembly 2) in the focus direction Fs until the focus error signal (FES) becomes zero. When the substrate 98 of the disk D has a thickness error (whereby spherical aberration occurs), the beam spot formed on the recording layer 99 is unfavorably greater, even after the focus control has been performed, than the beam spot formed when no spherical aberration occurs. In this instance, the second signal-processing unit 54 outputs a spherical aberration signal (SAS) whose level corresponds to the current spherical aberration.

Based on this SAS, the actuator 3b is operated to move the upper lens 3b relative to the lower lens 2a. In this manner, the distance S between the lower and the upper lenses 2a, 2b is made greater or smaller. Thus, the spherical aberration will be eliminated or alleviated. As the spherical aberration is reduced, the beam spot on the recording layer 99 of the disk D becomes smaller. Accordingly, the writing or reading of data with respect to the disk D can be properly performed.

Figure 5:
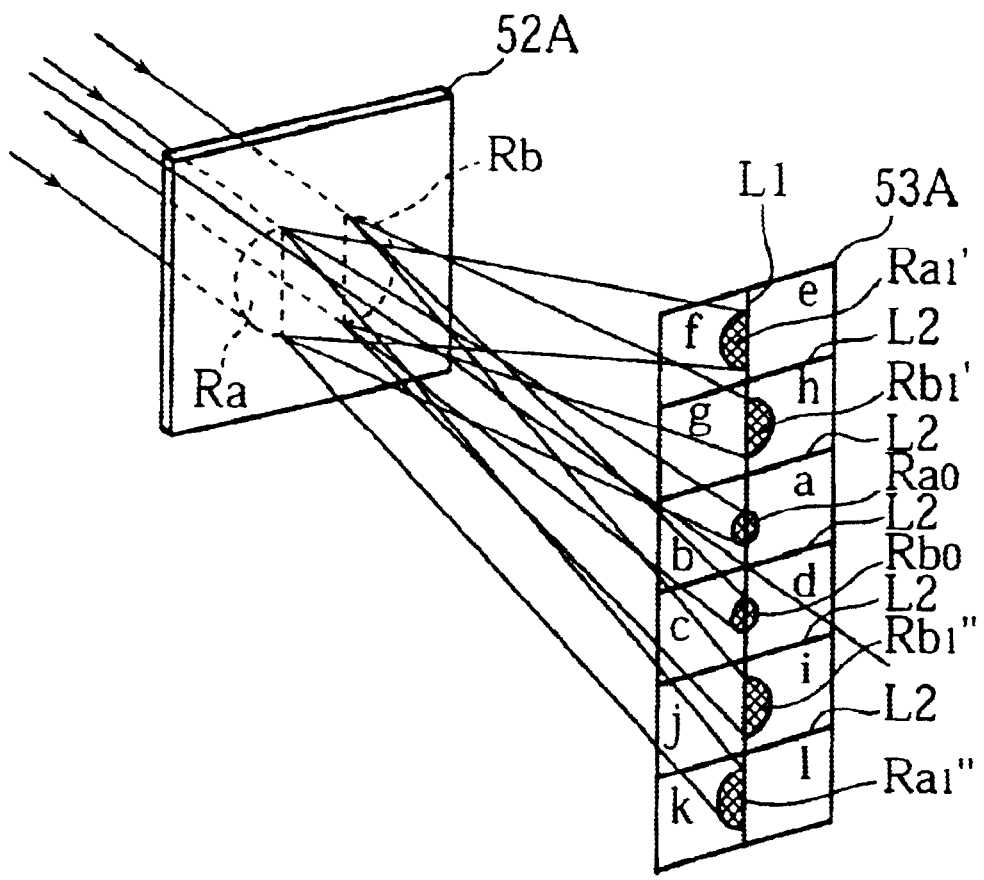
FIG. 5 is a perspective view illustrating how light is split by a holographic element used in an optical data-processing apparatus according to a second embodiment of the present invention.
Figure 6:
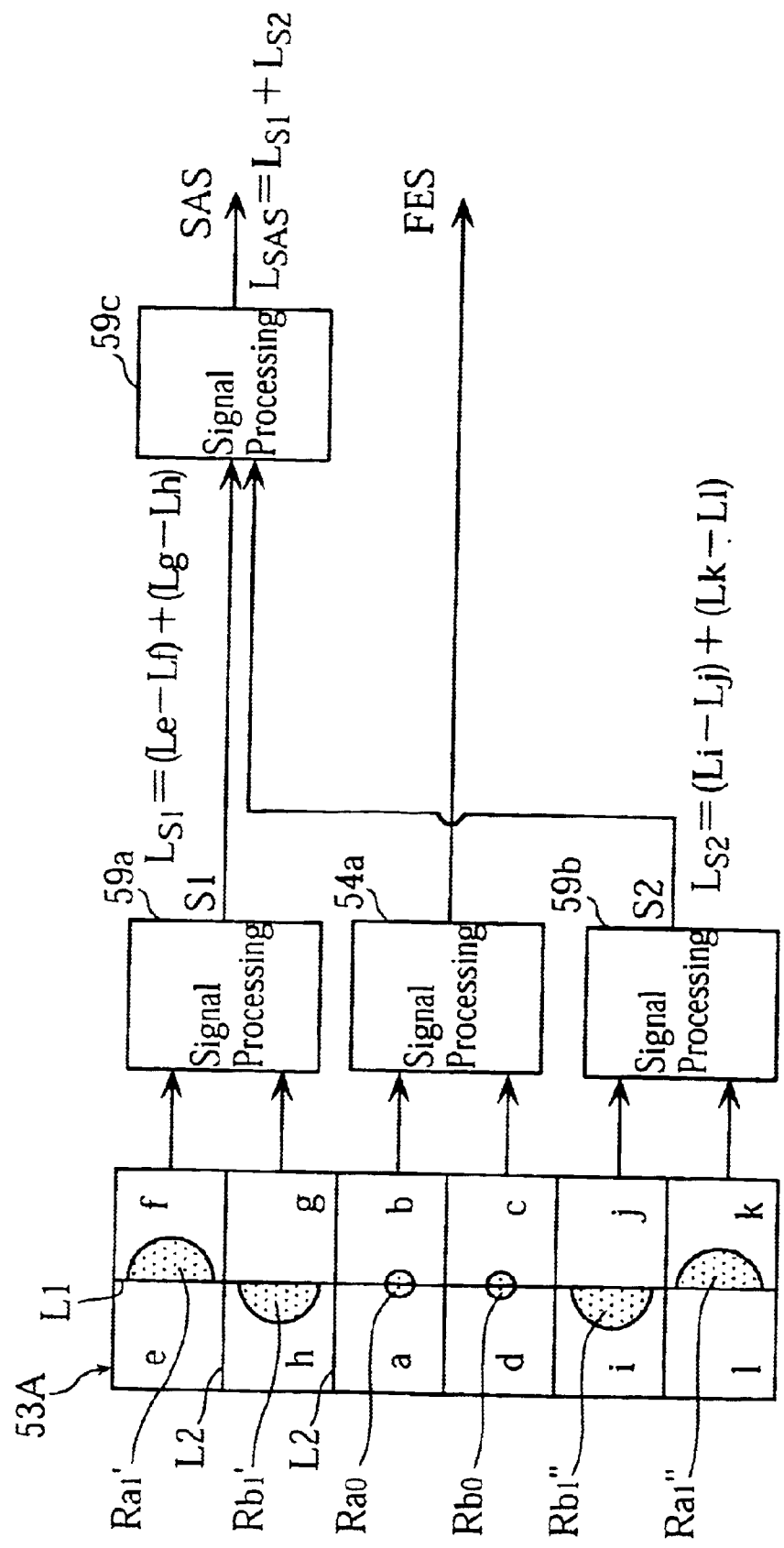
FIG. 6 shows the layout of the light-receiving surface of a detecting device used in the apparatus of FIG. 5 and signal processing units to generate required signals.

Reference is now made to FIGS. 5 and 6 illustrating the principal components of an optical data-processing apparatus according to a second embodiment of the present invention. Components which are not shown in these two figures may be the same or similar to those of the apparatus of the first embodiment. Therefore, no description about them will be given below.

As shown in FIG. 5, the apparatus of the second embodiment includes a holographic element 52A (corresponding to the element 52 in FIG. 1) and an optical detecting device 53A (corresponding to the device 53 in FIG. 1). The holographic element 52A splits two semicircular light beams Ra and Rb into six rays $Ra_0 \sim Rb_0$, $Ra_1' \sim Rb_1'$ and $Ra_1'' \sim Rb_1''$. Among these, the rays $Ra_1' \sim Rb_1'$ are plus(+) 1-order diffracted light, while the rays $Ra_1'' \sim Rb_1''$ are minus(−) 1-order diffracted light. The detecting device 53A has a light-receiving surface divided into twelve sections a~l defined by a vertical line L1 and five horizontal lines L2. When a non-illustrated lens assembly (corresponding to the assembly 2 in FIG. 1) is in the focus position, the rays $Ra_0 \sim Rb_0$ are shone on the vertical line L1, bridging between the right and the left sections a~b or c~d. The ray $Ra_1'$ is shone on the region e~f, the ray $Rb_1'$ is shone on the region g~h, the ray $Ra_1''$ is shone on the region i~j, and the ray $Rb_1''$ is shone on the region k~l.

As shown in FIG. 6, the detecting device 53A is connected to first to fourth signal-processing units 59a~59c and 54a. The first signal-processing unit 59a generates a signal S1 whose level $L_{S1}$ is equal to {(Le−Lf) +(Lg−Lh)}, where Le, Lf, Lg and Lh are the levels of the detection signals supplied from the light-receiving sections e, f, g and h, respectively. The second signal-processing unit 59b generates a signal S2 whose level $L_{S2}$ is equal to {(Li−Lj)+(Lk−Ll)}, where Li, Lj, Lk and Ll are the levels of the detection signals supplied from the light-receiving sections i, j, k and l, respectively. The third signal-processing unit 59c generates a spherical aberration signal (SAS) whose level $L_{SAS}$ is equal to ($L_{S1}$+ $L_{S2}$). The fourth signal-processing unit 54a (which corresponds to the signal-processing unit 54a of the first embodiment) generates a focus error signal (FES) based on the signals outputted from the light-receiving sections a~d.

In the second embodiment, as seen from FIG. 6, the signal S1 is generated based on the plus 1-order diffracted rays $Ra_1'$ and $Rb_1'$, while the signal S2 is generated based on the minus 1-order diffracted rays $Ra_1''$ and $Rb_1''$. When no spherical aberration occurs and the objective lens is in the right focus position, the beam profile of the reflected light is symmetrical before and behind focus, whereby the signals S1 and S2 have the opposite signs but equal absolute values. In this situation, the resulting SAS becomes zero. When spherical aberration occurs, on the other hand, the beam profile of the reflected light is asymmetrical, whereby the absolute values of the signals S1 and S2 are not equal. In this case, the $L_{SAS}$ (=$L_{S1}$+$L_{S2}$) has a non-zero value which corresponding to the degree and the direction of the spherical aberration. Thus, in the second embodiment again, it is possible to perform focus control (i.e., the adjustment of the distance between the lens assembly 2 and the disk D) based on the focus error signal. In addition, relying on the spherical aberration signal, it is possible to adjust the distance between the lower and the upper lenses 2a, 2b of the lens assembly 2. Accordingly, the spherical aberration will be eliminated or at least reduced. As a result, the beam spot on the disk D has an advantageously small diameter.

In the second embodiment, the detection of the spherical aberration is based on two kinds diffracted rays, that is, plus 1-order diffracted rays $Ra_1' \sim Rb_1'$ and minus 1-order diffracted rays $Ra_1'' \sim Rb_1''$. Thus, as compared with the first embodiment (where only one kind of 1-order diffracted rays Ra1~Rb1 are used), the spherical aberration can be detected more precisely.

Figure 7:
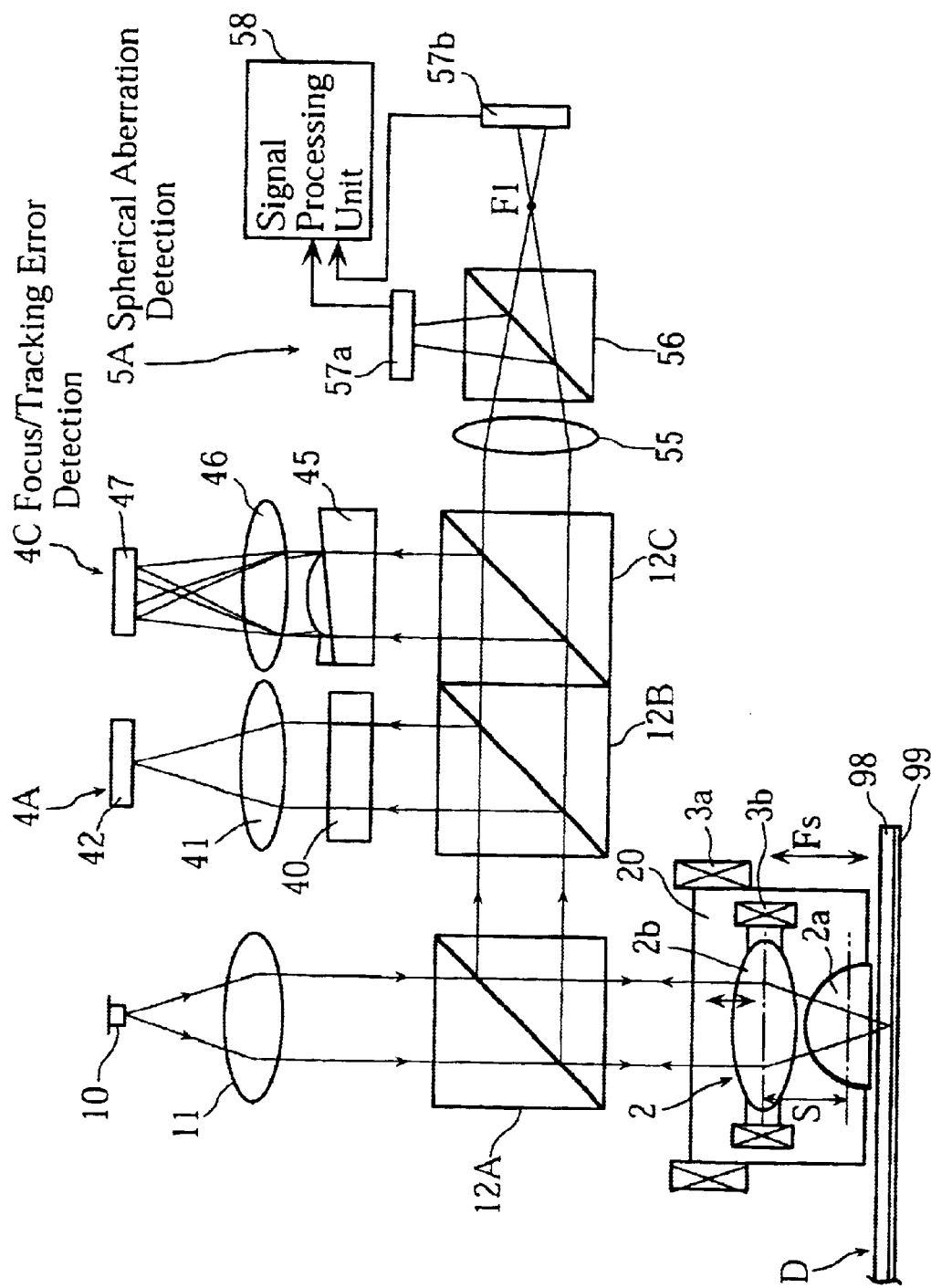
FIG. 7 shows the principal components of an optical data-processing apparatus according to a third embodiment of the present invention.
Figure 8:
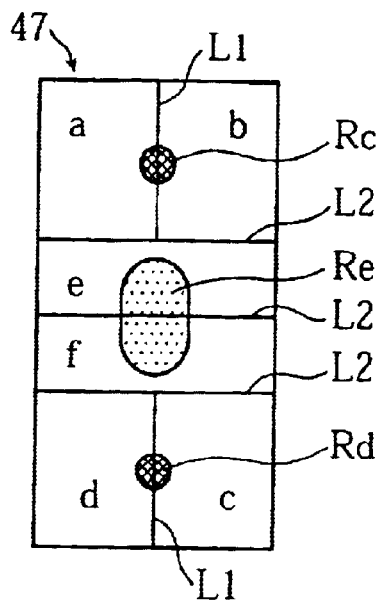
FIG. 8 shows the layout of the light-receiving surface of a detecting device used for detection of focus error/tracking error in the apparatus of FIG. 7.
Figure 9:
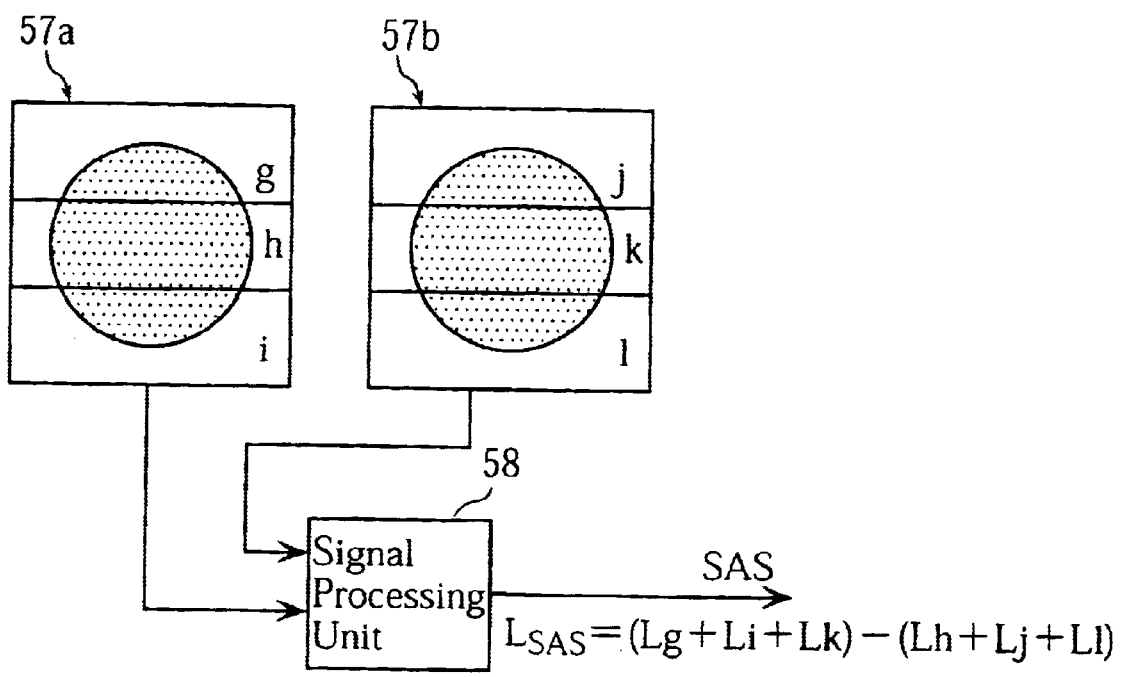
FIG. 9 shows the layout of the light-receiving surfaces of detecting devices used for detection of spherical aberration in the apparatus of FIG. 7.

FIGS. 7~9 show an optical data-processing apparatus according to a third embodiment of the present invention. As seen from the comparison between FIG. 7 and FIG. 1, the apparatus of the third embodiment and the apparatus of the first embodiment have several components in common. For instance, the apparatus of the third embodiment includes an objective lens assembly 2 (and the relevant actuation mechanism), a light source 10, a collimating lens 11, a first beam splitter 12A, a second beam splitter 12B, a Wallaston prism 40, a condenser (converging lens) 41, an optical detecting device 42 and a third beam splitter 12C.

The lens assembly 2 includes a lower lens 2a and an upper lens 2b supported by a holder 20. The holder 20 is movable, together with the incorporated two lenses, in the focus direction Fs. Independent of the movement of the holder 20, the upper lens 2b can be moved in the focus direction Fs relative to the lower lens 2a, whereby the distance S between the lower and the upper lenses 2a, 2b is adjusted.

Differing from the first embodiment, the reflected light split by the third beam splitter 12C is partly led to a focus/tracking error detector 4C, and partly led to a spherical aberration detector 5A. In the focus/tracking error detector 4C, the light from the third splitter 12C passes through a compound prism 45 and a condenser (converging lens) 46, to be received by an optical detecting device 47.

As shown in FIG. 8, the detecting device 47 has a light-receiving surface divided into six sections a~f defined by two vertical lines L1 and three horizontal lines L2. In this embodiment again, the reflected light from the disk D contains 0-order diffracted light (see R0 in FIG. 4), 1-order diffracted light (R1), and interference light (I) resulting from these diffracted beams. In the third embodiment, a first kind of light and a second kind of light are received by the detecting device 47 in the following manner.

The first kind of light, whose dominant component is 0-order diffracted light R0, is split into two rays Rc and Rd. Of these, the ray Rc is received by the a~b region in a manner such that the spot extends across the upper vertical division line L1. The other ray Rd is received by the c~d region in a manner such that the spot extends across the lower vertical division line L1. The second kind of light Re, whose dominant component is the interference light I (see FIG. 4), is received by the e~f region in a manner such that the spot extends across the horizontal division line L2, as shown in FIG. 8.

In the focus/tracking error detector 4C, a focus error signal (FES) and a tracking error signal (TES) are generated. The level $L_{FES}$ of the FES is equal to {(La−Lb)+(Lc−Ld)}, where La~Ld are the output levels of the signals supplied from the sections a~d, respectively. The level $L_{TES}$ of the TES is equal to (Le−Lf), where Le and Lf are the output levels of the signals supplied from the sections e and f, respectively.

In the spherical aberration detector 5A, the reflected light from the third beam splitter 12C passes through a condenser (converging lens) 55 and enters a fourth beam splitter 56. In the beam splitter 56, the light is split into two rays, one of which is received by an optical detecting device 57a, and the other of which is received by another optical detecting device 57b. As shown in FIG. 7, the condenser 55 has a focus F1. The detecting device 57a is responsible for detection of light that does not pass through the focus F1, while the detecting device 57b is responsible for detection of light that passes through the focus F1.

The detecting devices 57a, 57b have a light-receiving surface, as shown in FIG. 9, that is divided into three sections g~i or j~l over which a circular light spot may be formed.

The detecting devices 57a, 57b are connected to a signal processing unit 58 to generate a spherical aberration signal (SAS) by the method called "spot size detection", which is similar to the focus error detection. The level $L_{SAS}$ of the SAS is equal to $\{(Lg+Li+Lk)-(Lh+Lj+Ll)\}$, where Lg, Lh, Li, Lj, Lk and Ll are the output levels of the detection signals supplied from the sections g~l, respectively. Adjustments are made in advance so that the level $L_{SAS}$ becomes zero when there is no thickness error in the substrate of the disk D.

According to the third embodiment, when no spherical aberration occurs and the objective lens is in the right focus point, the beam profile of the reflected light becomes symmetrical, whereby the $L_{SAS}$ is equal to zero. When some spherical aberration occurs, the reflected light from the disk D has different intensities at a point in front of the focus point F1 and at a point behind the same focus point. This difference, which becomes greater as the spherical aberration increases, can be known by the detection of the $L_{SAS}$.

With the above arrangement, the signal-processing unit 58 provides a spherical aberration signal (SAS) whose output level and sign correspond accurately to the spherical aberration. Based on this accurate signal, the positional adjustment of the upper lens 2b can be performed properly. Thus, it is possible to prevent spherical aberration from occurring, which serves to form an appropriately small beam spot on the disk D.

As seen from the third embodiment described above, an optical system to detect spherical aberration may be provided separately from an optical system to detect focus error or tracking error.

Figure 10:
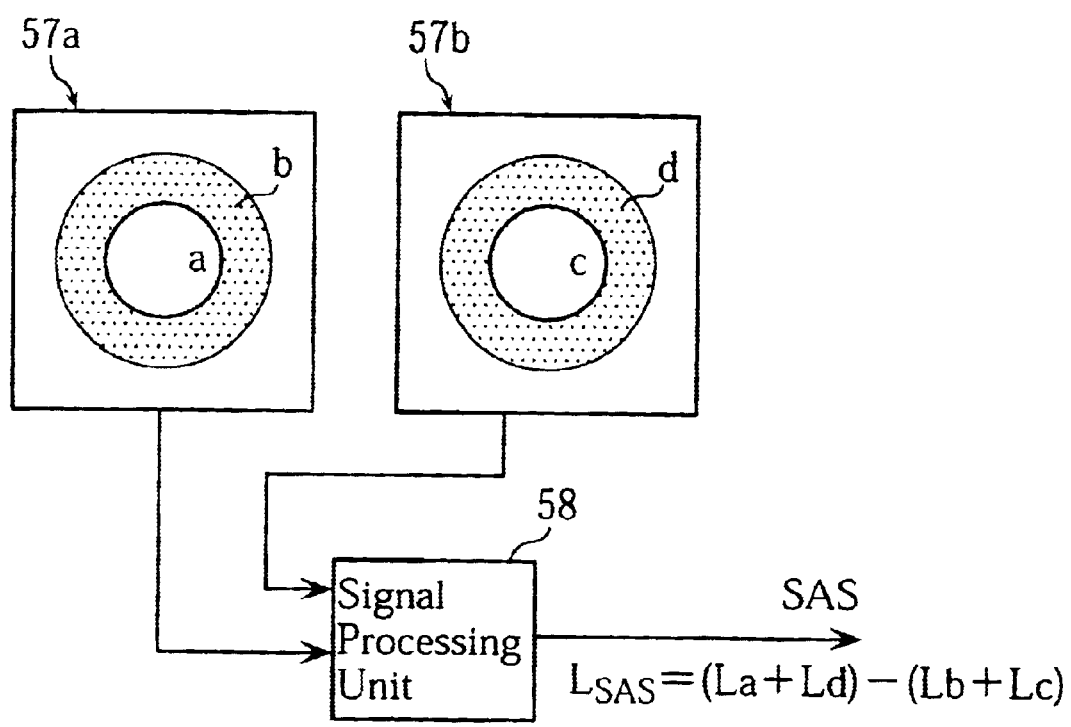
FIG. 10 shows another possible layout of the light-receiving surfaces of detecting devices used for detection of spherical aberration in the apparatus of FIG. 7.
Figure 11:
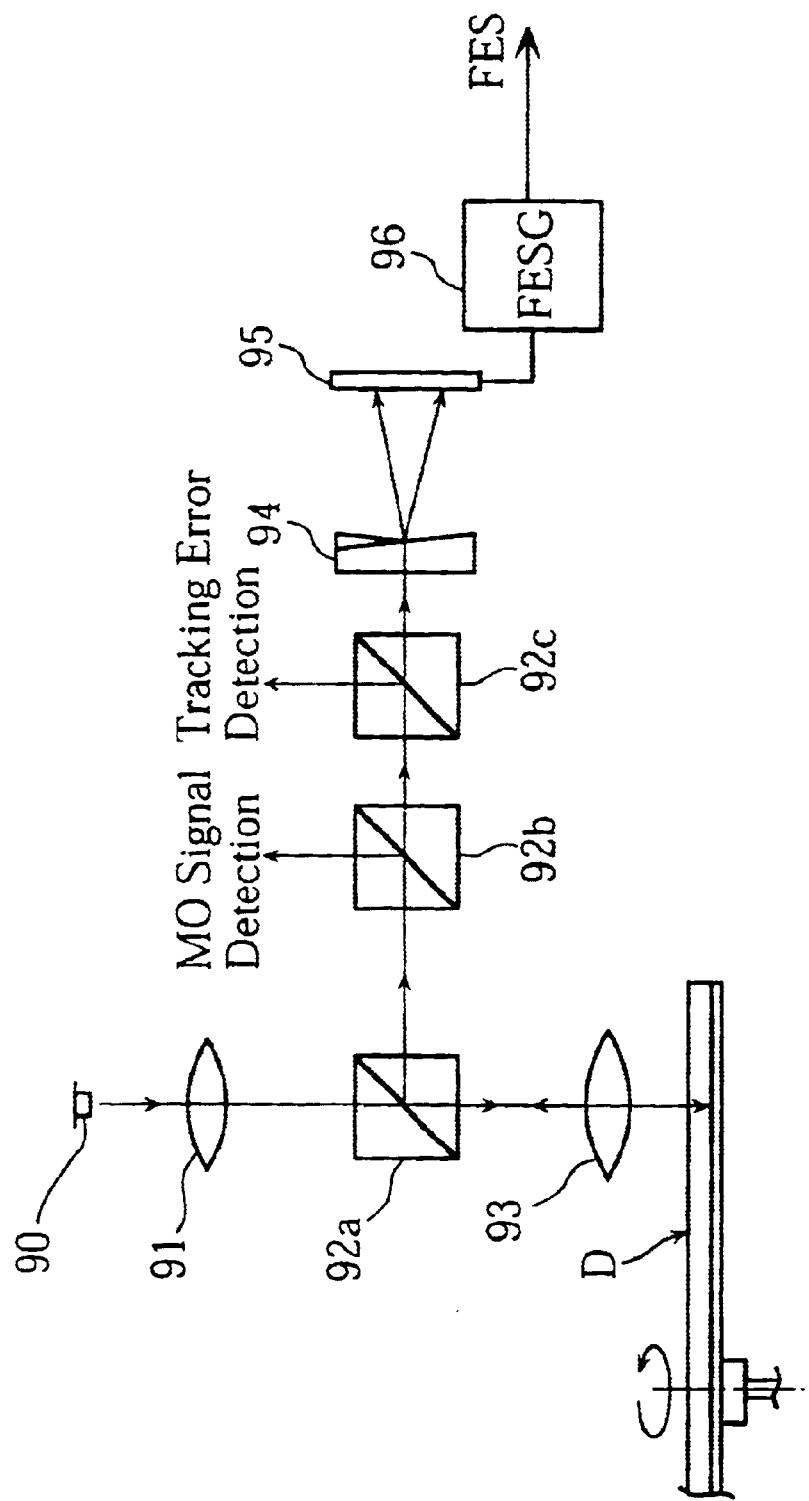
FIG. 11 shows the principal components of a conventional data-processing apparatus.
Figure 12:
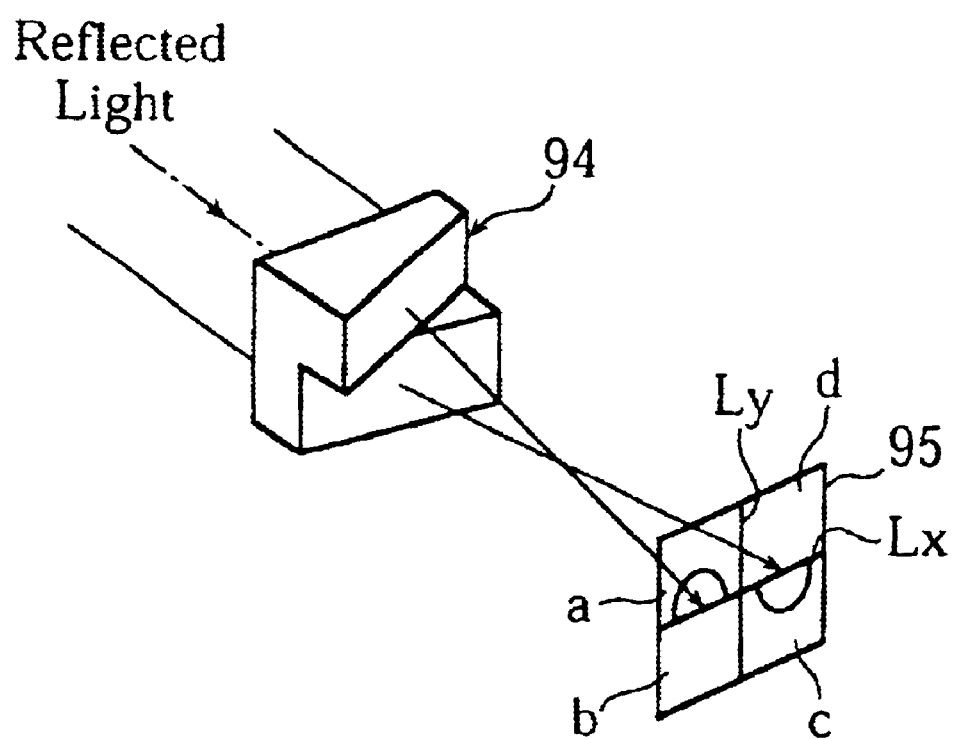
FIG. 12 is a perspective view showing how light is split by a compound prism used in the apparatus of FIG. 11.
Figure 13A:
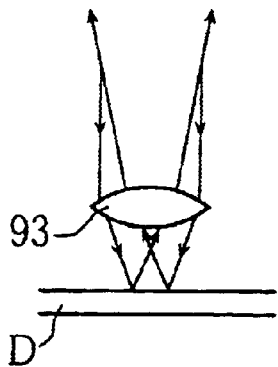
FIGS. 13A~13B, 14A~14B and 15A~15B illustrate the principle of the Foucault method.
Figure 13B:
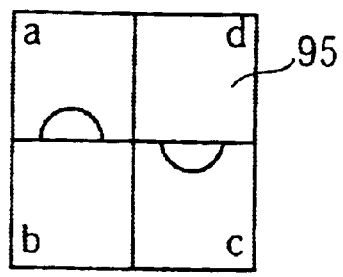
Figure 14A:
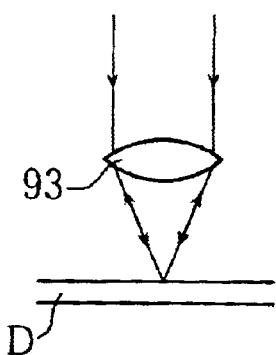
Figure 14B:
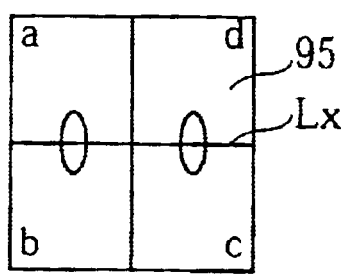
Figure 15A:
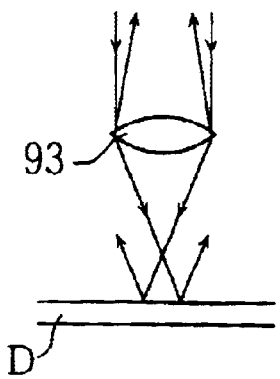
Figure 15B:
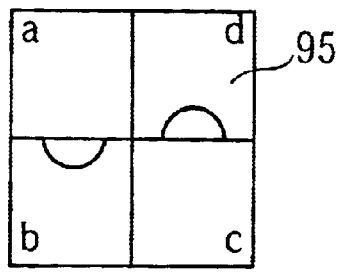

FIG. 10 shows a possible layout for the light-receiving surfaces of the optical detecting devices 57a, 57b. In the illustrated example, each of the detecting devices 57a, 57b has a light-receiving surface divided into a circular central detecting section a or c and a torus detecting section b or c that encircles the central detecting section. The signal-processing unit 58 generates a spherical aberration signal (SAS) whose output level $L_{SAS}$ is equal to $\{(La+Ld)-(Lb+Lc)\}$, where La~Ld are the levels of the signals supplied from the detecting sections a~d, respectively.

The present invention being thus described, it is obvious that the same may be varied in many ways. Such variations are not to be regarded as a departure from the spirit and scope of the present invention, and all such modifications as would be obvious to those skilled in the art are intended to be included within the scope of the following claims.

What is claimed is:

1. An optical data-processing apparatus comprising:
   an objective lens for convergence of light beams emitted from a light source to make a beam spot on a recording layer of an optical data storage medium;
   a first light splitter for splitting reflected light from the storage medium into two semicircular rays;
   a second light splitter for splitting the two semicircular rays into non-biased light and biased light which has a different optical path length than the non-biased light;
   an optical detector that receives the non-biased light and the biased light, thereby producing a first signal corresponding to the received non-biased light and a second signal corresponding to the received biased light;
   a first signal processing unit for generating a focus error signal based on the first signal; and
   a second signal processing unit for generating a spherical aberration signal based on the second signal.

2. The apparatus according to claim 1, wherein the biased light split by the second light splitter includes plus 1-order diffracted light and minus 1-order diffracted light, and wherein the second signal processing unit generates the spherical aberration signal based on the plus 1-order diffracted light and the minus 1-order diffracted light.

3. An optical data-processing apparatus comprising:
   an objective lens unit for convergence of light beams emitted from a light source to make a beam spot on a recording layer of an optical data storage medium;
   a focus error detector that produces a focus error signal based on reflected light from the storage medium; and
   a spherical aberration detector into which the reflected light is introduced, the spherical aberration detector being provided separately from the focus error detector;
   wherein the spherical aberration detector comprises:
      a beam splitter for splitting the reflected light into two beams;
      a converging lens for convergence of the reflected light before the light splits into the two beams;
      first and second optical detecting devices for receiving the two beams, the first optical detecting device and the second optical detecting device being disposed at different distances from said converging lens; and
      a signal processing unit for generating a spherical aberration signal based on intensity distribution of the beams received by the detecting devices.

4. The apparatus according to claim 1 or 3, wherein the objective lens unit is movable in a focus direction and supports first and second lenses aligned in the focus direction, said first lens being movable in the focus direction relative to said second lens.

5. The apparatus according to claim 4, wherein said first lens and said second lens are simultaneously moved for focus control in the focus direction based on the focus error signal, and wherein said first lens is moved relative to said second lens based on the spherical aberration signal for reduction of spherical aberration.

* * * * *